United States Patent [19]

Rabbani et al.

[11] Patent Number: 5,412,427
[45] Date of Patent: May 2, 1995

[54] ELECTRONIC CAMERA UTILIZING IMAGE COMPRESSION FEEDBACK FOR IMPROVED COLOR PROCESSING

[75] Inventors: Majid Rabbani; Craig M. Smith, both of Pittsford, N.Y.

[73] Assignee: Eastman Kodak Company, Rochester, N.Y.

[21] Appl. No.: 145,449

[22] Filed: Oct. 29, 1993

[51] Int. Cl.6 .......................................... H04N 11/04
[52] U.S. Cl. ................... 348/394; 348/396; 348/393
[58] Field of Search ............. 348/391, 397, 398, 393, 348/419, 242, 394; H04N 7/13, 11/04

[56] References Cited

U.S. PATENT DOCUMENTS

| | | | |
|---|---|---|---|
| 3,971,065 | 7/1976 | Bayer | 358/41 |
| 4,656,500 | 4/1987 | Mori | 348/395 |
| 4,716,453 | 12/1987 | Pawelski | 348/396 |
| 5,038,209 | 8/1991 | Hang | 348/419 |
| 5,053,861 | 10/1991 | Tsai et al. | 358/13 |
| 5,065,229 | 11/1991 | Tsai et al. | 358/21 R |
| 5,072,290 | 12/1991 | Yamagami et al. | 348/396 |
| 5,172,227 | 12/1992 | Tsai et al. | 358/133 |

Primary Examiner—Victor R. Kostak
Attorney, Agent, or Firm—David M. Woods

[57] ABSTRACT

An electronic camera is disclosed that employs a color transformation stage 14 for transforming primary color signals into luminance and chrominance signals. The luminance signal is subjected to a lossy compression in the compression stage 16a, and then decoded in the decompression stage 32 to generate a feedback signal having lossy artifacts. The feedback signal is used in the generation of the chrominance signals prior to their compression, which causes the later-reconstructed chrominance signals to have fewer artifacts due to the compression algorithm.

8 Claims, 5 Drawing Sheets

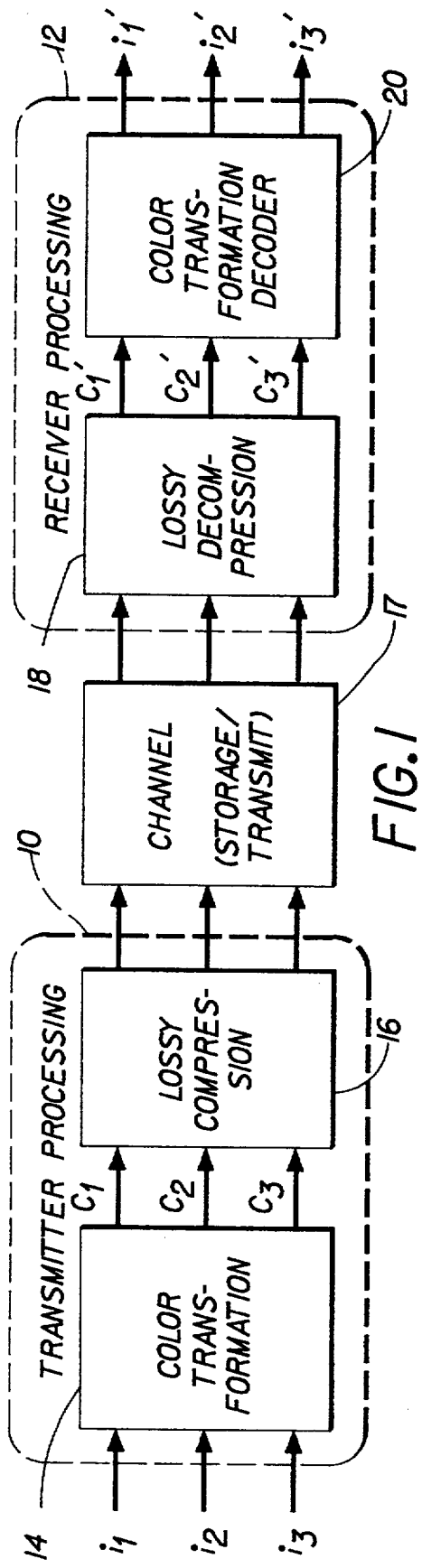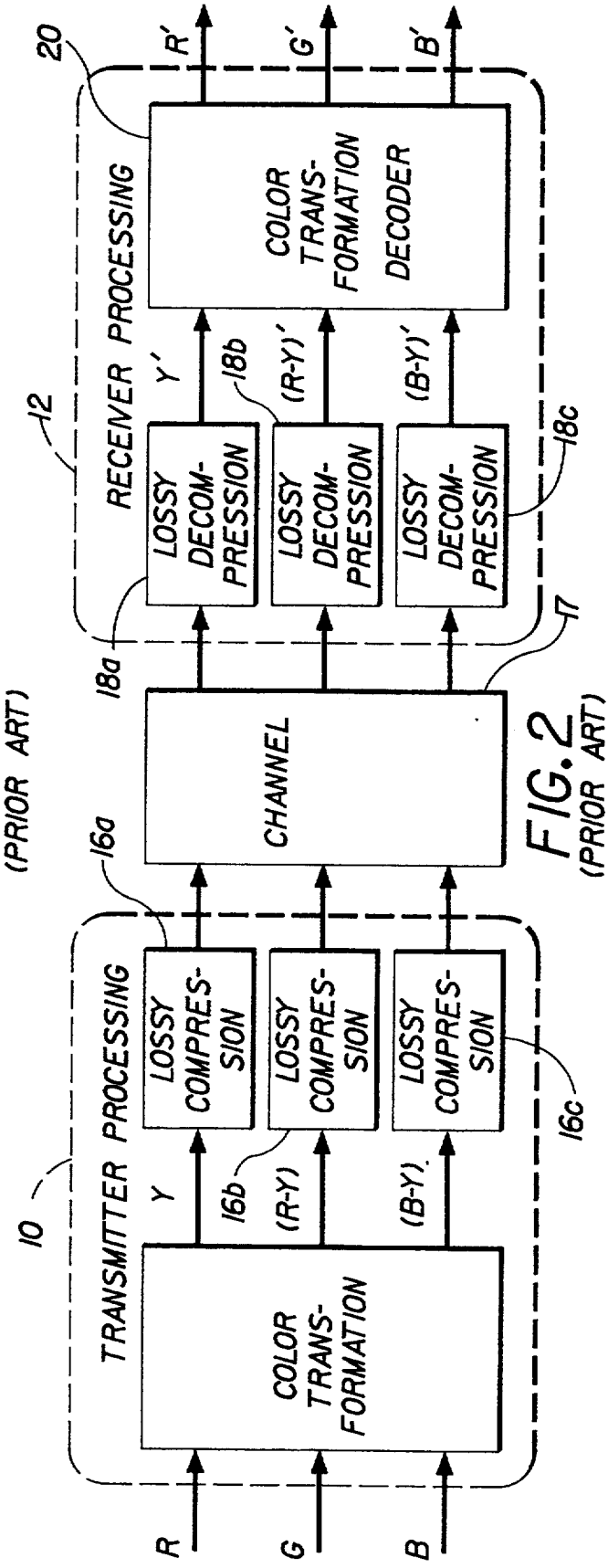

FIG. 4
(PRIOR ART)

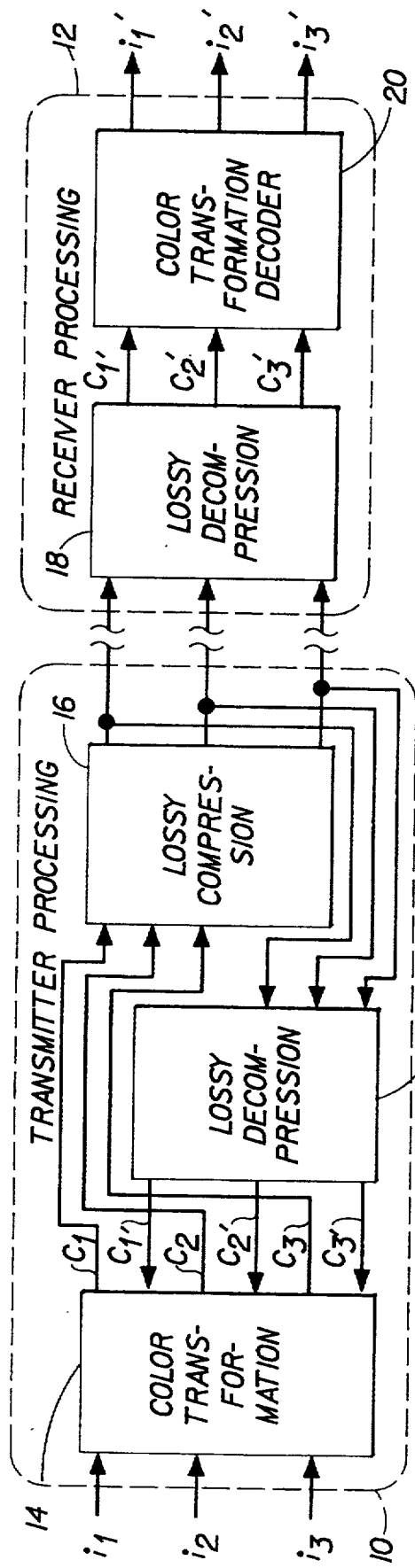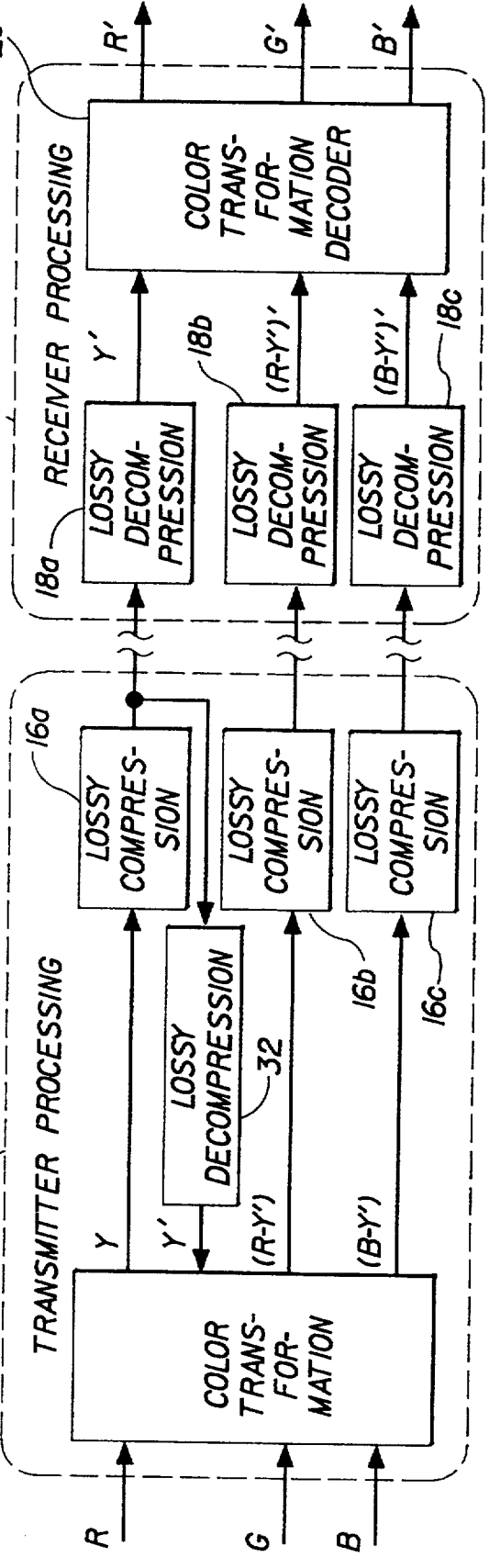

ELECTRONIC CAMERA UTILIZING IMAGE COMPRESSION FEEDBACK FOR IMPROVED COLOR PROCESSING

FIELD OF THE INVENTION

The present invention relates to the field of digital image processing in an electronic camera, and more particularly to methods and associated apparatus for improving the image quality of a color image in a processing system including both color transformation and image compression.

BACKGROUND OF THE INVENTION

In many digital imaging systems, the input color image comprises several digital records, such as records composed of the red, green, and blue (R,G,B) tristimulus values corresponding to the color image. It is common for these records to undergo some form of a color transformation, and then to undergo some form of lossy compression prior to storage or transmission; this is followed on the receiving side by decompression, and further image processing. At the final stage of viewing or printing the image, the color components are usually transformed back to their original values, e.g., R,G,B. An example of such a system is a digital camera in which an image is captured using an image sensor covered by a color filter array (CFA). The CFA generates a subsampled RGB record, in which, depending on the configuration of the CFA used, the individual R, G, and B records may be of different sizes. The CFA image data, which represents the raw image data, is usually subjected to a color transformation. A typical color transformation provides a green record G in conjunction with two color difference records, such as (R−G) and (B−G), or (LogR−LogG) and (LogB−LogG), depending on the nature of the image capture. To conserve storage space and/or channel capacity, the transformed image is usually compressed prior to storage, using any of several well-known compression techniques, such as predictive coding or transform coding.

In the prior art, it is known to use color transforms that are suitable for images captured through a CFA, as well as to use transforms that optimize the compression performance for a given CFA pattern. Of relevance are the following patents:

- U.S. Pat. No. 5,172,227 entitled "Image compression with color interpolation for a single sensor image system", by Tsai, Daly and Rabbani.
- U.S. Pat. No. 5,053,861 entitled "Compression method and apparatus for single-sensor color imaging systems", by Tsai, Parulski, and Rabbani.
- U.S. Pat. No, 5,065,229 entitled "Compression method and apparatus for single-sensor color imaging systems", by Tsai, Parulski, and Rabbani.

Each of these patents describes techniques for compressing the image signals from a single sensor color array prior to color interpolation.

The initial color transformation is typically performed independent of the subsequent compression. Consider FIG. 1, which is a block diagram of a generic digital image processing system comprising a transmitter processing section 10 and a receiver processing section 12. The transmitter processing section 10 provides an initial color transformation stage 14 for transforming input color image signals $i_1$, $i_2$, $i_3$ into output $c_1$, $c_2$, $c_3$ signals, followed by lossy image compression of the respective signals in a compression stage 16. The compressed bit stream is usually stored or transmitted in a signal channel 17. At the receiver processing section 12, due to the lossy nature of the compression scheme, each compressed color record is decompressed in the decompression stage 18 and reconstructed in a color transformation decoder stage 20 into a color record that is an approximation to the original color record prior to compression. The degree of approximation depends on the amount of loss that is introduced by the compression stage 16. In such systems, the initial color transformation stage 14 and the subsequent compression stage 16 are decoupled and performed in isolation.

FIG. 2 shows a common application of the generic system shown in FIG. 1. In this application, the input image is made up of three components: red (R), green (G), and blue (B). The image is transformed in the color transformation stage 14 into luminance and chrominance components, in this case, one luminance record (Y) and two color difference records (R-Y) and (B-Y). These records are compressed with loss in respective luminance and color difference compression stages 16a, 16b, 16c. At the receiver processing section 12, the original image data is approximately reconstructed by decompressing the compressed bit stream in respective luminance and color difference decompression stages 18a, 18b, 18c, followed by color decoding in the stage 20.

FIG. 3 shows a further example of the system of FIG. 1, as would typically be used in the processing section 10 of a digital electronic camera using the CFA pattern depicted in FIG. 4 (conventionally known as the Bayer pattern, and described in U.S. Pat. No. 3,971,065). The color transformation stage 14 includes a demultiplexer 22 for separating the stream of image pixels into R, G, and B records. The green (G) record, which is representative of luminance and (for the Bayer pattern) constitutes 50% of the total number of image pixels, is then interpolated in the green interpolator 24 to provide the missing green values for those pixel locations that contain a red (R) or blue (B) pixel value. Simple horizontal averaging is a suitable interpolation algorithm; other algorithms could, of course, be used. The interpolated green record, denoted by $G_I$, is then used to form the color difference records $(R-G_I)$ and $(B-G_I)$, as depicted in FIG. 3, by summing the interpolated green record with the red and blue records in respective summing elements 26a and 26b. The original green record, along with the color difference records are compressed in stages 16a, 16b, 16c and stored in the camera in a storage module 28.

At the receiver processing section 12, this process is reversed to construct an approximation to the original image. The green record is decompressed in the luminance decompression stage 18a to provide an approximation G' of the original green record G, and then interpolated in the interpolator 24' to provide an interpolated approximation $(G')_I$ of the interpolated green record $G_I$. A particular problem is that lossy artifacts in the interpolated approximation $(G')_I$ are cascaded through the red and blue records by summing the interpolated approximation $(G')_I$ with the color difference approximations $(R-G_I)'$ and $(B-G_I)'$ provided by the color difference decompression stages 18b and 18c. Instead of having the green contributions cancel in the summing elements 26a', 26b', however, the lossy artifacts in the interpolated approximation $(G')_I$ of the green contribution and the color difference approximations $(R-G_I)'$ and $(B-G_I)'$ are unlike, and thus do not cancel for the green contributions. This leaves the reconstructed red and blue records R', B' with lossy artifacts due to the green record.

SUMMARY OF THE INVENTION

It is therefore an object of this invention to improve the final image quality, in particular by providing a feedback from the decompression stage into the color transformation stage.

Accordingly, the invention includes an electronic camera that generates a plurality of color signals corresponding to the intensity of the light imaged by the camera. The camera further transforms the color signals into a plurality of encoded signals, and compresses the encoded color signals. The benefit of the invention is obtained by feedback means that generates a decompressed signal from at least one of the compressed color signals, and applies the decompressed signal to the transformation stage for use in generating one or more of the encoded signals.

The advantageous effect of the invention is due to coupling the color transformation and compression stages so that color transformation is in part dependent upon the compression stage. In particular, we take advantage of the fact that after the application of the lossy compression in the transmitter processing section, the color decoding algorithm in the receiver processing section only has access to the decompressed values, which are then used to reconstruct an approximation of the color records prior to the initial color transformation. We have found that it is beneficial to feed back the decompressed values of one or more compressed color components into the initial construction of the remaining components, prior to the compression of such components. This limits the propagation of the noise and artifacts resulting from the lossy compression scheme into such color components, usually resulting in an improved reconstructed image quality.

BRIEF DESCRIPTION OF THE DRAWINGS

The prior art and the invention are described in relation to the drawings, in which FIG. 1 is a block diagram illustrating a known generic system that contains stages of color transformation, lossy image compression and decompression, and color decoding;

FIG. 2 is a block diagram of a known system application of the generic system of FIG. 1 in which an original image consisting of red (R), green (G), and blue (B) components is transformed into a luminance record (Y) and two color difference records $(R-Y)$ and $(B-Y)$;

FIG. 4 is an example illustrating a color filter array (CFA) pattern of red, green, and blue sensors employed in the digital camera of FIG. 3;

FIG. 5 is a block diagram illustrating generic means for improving the image quality of the system of FIG. 1, according to the invention, by providing a decompressed feedback from the image compression stage into the color transformation stage;

FIG. 6 is a block diagram illustrating an improved system of FIG. 2, according to the invention, in which feedback of the decompressed luminance record is provided to the color transformation stage for use in forming the color difference records.

DESCRIPTION OF THE PREFERRED EMBODIMENTS

Figure 3:
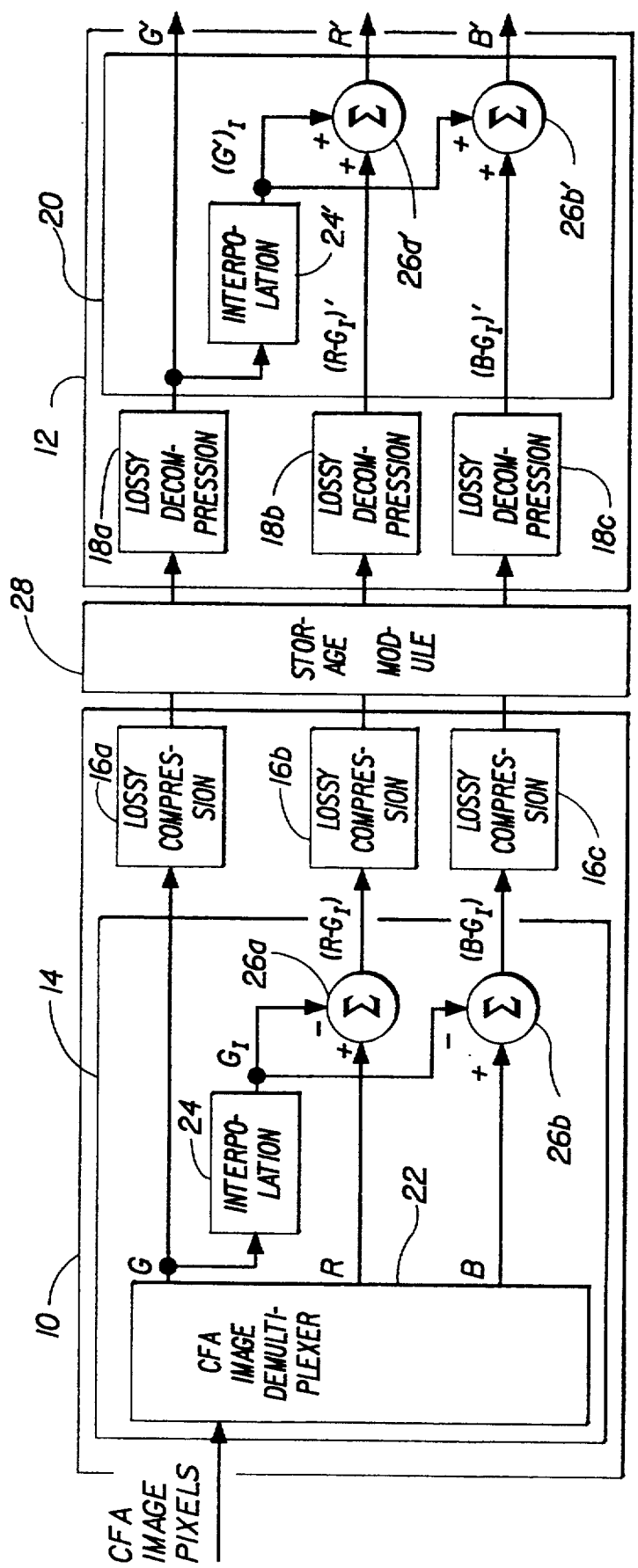
FIG. 3 is a block diagram illustrating the system of FIG. 1 applied to a digital camera containing the stages of color transformation, lossy compression, storage, decompression, and color decoding.

This invention aims to improve the image quality of an imaging system of the type shown in FIG. 1, which comprises a color transformation stage followed by lossy image compression and decompression stages, and a color transformation decoding stage. The improvement is obtained as shown in FIG. 5 by providing a feedback from the output of the compression stage 16 through a feedback decompression stage 30 into the color transformation stage 14. The use of the feedback signal is particularly advantageous in a color transformation stage that forms one or more of its output signals $c_1$, $c_2$, $c_3$ as a function of two or more of the primary signals $i_1$, $i_2$, $i_3$ input to the stage. To illustrate the point further, as an improvement to the known application shown in FIG. 2, the compressed luminance record may be reconstructed at the output of the transmitter processing section 10. More specifically, as shown in FIG. 6, the output of the luminance compression stage 16a is decompressed in a luminance feedback decompression stage 32, and then used to construct the color difference records prior to their compression. Since only the decompressed values are available at the input to the color transformation decoder 20, the use of this feedback mechanism can potentially improve the final image quality by reducing the propagation of compression artifacts that have been created in the luminance record into the difference color records.

As seen from FIG. 5 and FIG. 6, a decompressor (decoder) is needed at the encoder stage prior to transmission or storage. The cost associated with providing this feedback depends on the type of the image compression method employed. In many image compression schemes, such as predictive coding schemes where differential pulse code modulation (DPCM) is a variant, the encoder would automatically contain a decoder, since the reconstructed values are needed at the encoder in order to construct the prediction for the next pixel value. As a result, the implementation of the present invention results in no extra complexity. On the other hand, certain compression schemes, such as schemes based on block transformations where the JPEG International Standard is a variant, do not include a decoder at the encoder side. For such systems, the implementation of the proposed invention would entail the extra cost of providing a decoder at the encoder end. However, even when transform based techniques are used, depending on the functionality of the system, a decoder may still be needed for other reasons, and can thus be used to provide the feedback. An example is a system that uses a hierarchical representation of an image, e.g., an image pyramid where the image is compressed and stored at multiple resolutions (e.g., the hierarchical mode of the JPEG International Standard). In such systems, it is customary to use a lower resolution reconstructed (decompressed) image as a prediction for the same image at a higher resolution. The decompressor (decoder) would then be an essential part of the encoder in such a system.

Figure 4:
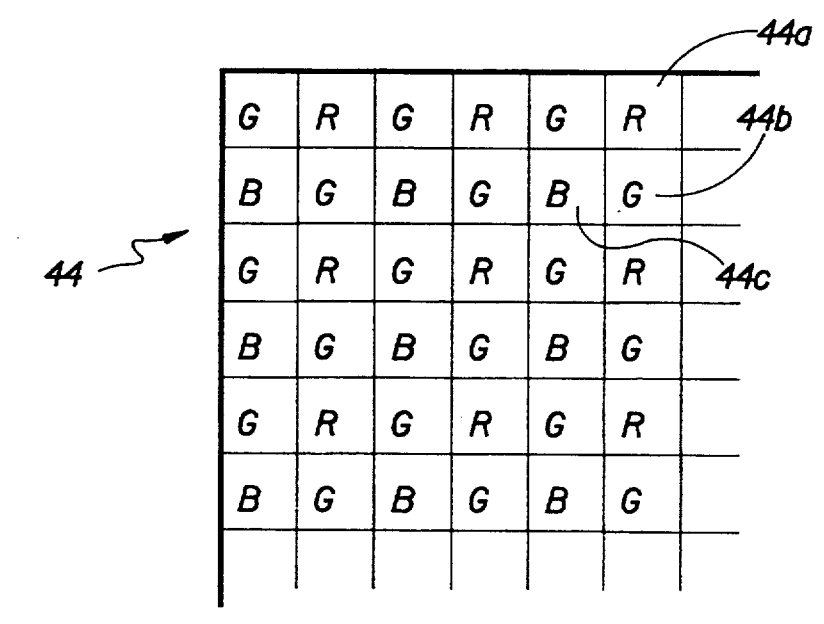
Figure 7:
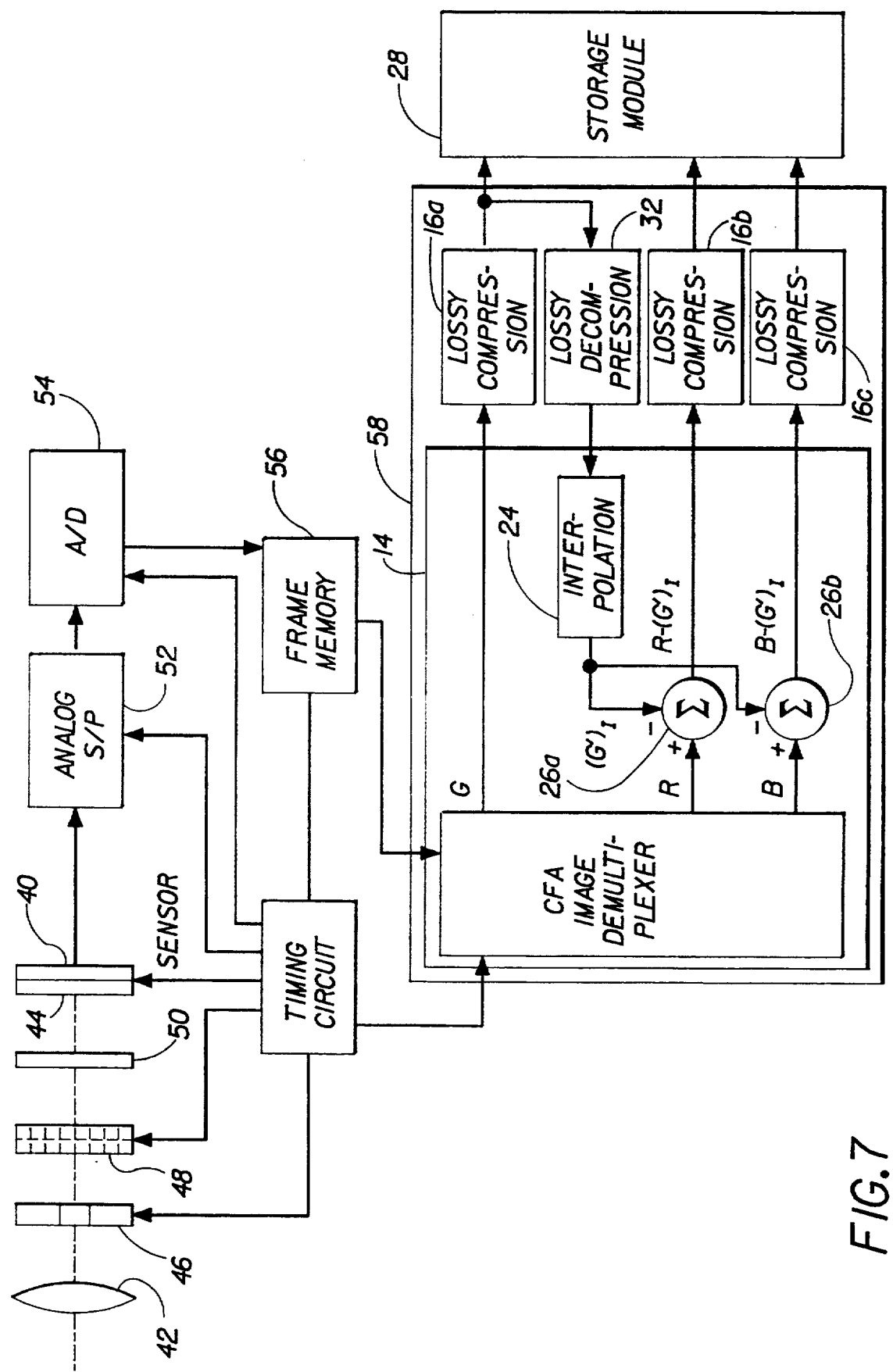
FIG. 7 is a block diagram illustrating an improved digital camera of FIG. 3, according to the invention, in which feedback of the decompressed luminance record is provided to the summing sections of the color transformation stage.

A preferred embodiment of the proposed invention, which also quantifies its potential performance gains, includes a digital camera as depicted in FIG. 3, using the Bayer CFA pattern as depicted in FIG. 4. Referring to FIG. 7, a preferred embodiment of the invention is shown incorporated in such a digital electronic camera. The image of a scene (not shown) is focused onto an image sensor 40 by a camera lens 42. The image sensor 40 is composed of a number of discrete photosite elements or pixels arranged in a two-dimensional array to form individual photosites. A regular array 44 of color filters, as shown in FIG. 4, covers the individual photosites, with each photosite corresponding to a respective R, G, or B color filter 44a, 44b, or 44c. The photosites respond to the appropriately colored incident illumination to provide an analog signal corresponding to the intensity of the illumination incident on the photosites. Because of the CFA, the analog signal is a stream of primary color signals corresponding to the colors of the CFA. An exemplary image sensor has 768×512 square pixels arranged in 480 active lines of 640 pixels per line.

A lens aperture 46 and a shutter 48 are interposed between the camera lens 42 and the image sensor 40 in order to provide the proper sensor illumination level for a variety of scene light levels. An optical low pass filter 50 is placed in front of the image sensor 40 in order to reduce color aliasing. The primary color signals from the image sensor 20 are processed by the analog signal processor 52, which incorporates, for example, a correlated double sampling circuit, a white balance circuit, and a gamma correction circuit. Such circuits are well known in this art. The output of the analog signal processor 52 is converted from analog form to digital form in an A/D converter 54. The A/D converter 54 provides an 8 bit signal in the sequence of the "Bayer" pattern CFA as shown in FIG. 4.

The digitized color signals are stored in a frame memory 56, and from there are accessed by a digital processing stage 58 (which corresponds to the transmitter processing section 12 in FIGS. 5–6), which encodes the primary color signals into luminance and chrominance signals, and compresses the encoded signals. In particular, the digital processing stage 58 includes the color transformation stage 14 and the luminance and color difference compression stages 16a, 16b, 16c shown in connection with FIG. 5. The CFA demultiplexer 22 and the green interpolator 24 are used to produce R, G, B signal streams and to reconstruct the interpolated green record, which is combined with the red and blue records in summers 26a and 26b to provide color difference signals. (In accordance with the convention used herein, the unchanged green output from the demultiplexer and the color difference signals are "encoded" signals.) According to the invention, the input to the green interpolator 24 is taken from the luminance feedback decompression stage 32 (as also shown in FIG. 6).

Using the present invention, as shown in FIG. 7, the performance of the system of FIG. 3 is improved by first compressing and decompressing the green record, and then using the reconstructed green record to interpolate the missing green values. The color differences are subsequently constructed based on the interpolated green and compressed. Simulations performed using a fixed-rate predictive coding scheme demonstrate an average reduction of about 20% in the compression mean-squared-error (MSE) of the red and the blue records of typical continuous tone images. Thus, by providing a feedback from the compression stage into the color transformation stage, improved reconstructed image quality can be achieved. Furthermore, depending on the nature of the compression scheme, this improved image quality may be achieved at no extra complexity.

The digital electronic camera of FIG. 7 is used with the receiver processing section 12, such as shown in FIG. 3. The benefit of the invention is therefore obtained without necessitating changes in the known section 12. The compressed green and color difference signals are stored in the storage module 28, which may be a permanent part of the camera or may be detachable from the camera. The receiver processing section 12 may be part of a conventional player or, preferably, a software driver or like component of a personal computer. The compressed signals, if part of a permanent storage module, could be downloaded to the personal computer by a conventional cable interface. If removable, the storage module 28 could be transported to, and inserted into, an appropriate memory interface on the computer.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention. For example, while a single-sensor color camera is shown, the primary color signals could originate from separate image sensor devices. Moreover, while an RGB color array is shown, other arrays employing other combinations (e.g., cyan, magenta, yellow, white) could be used. ("Primary" color signals should therefore be taken to include cyan, etc. color signals.) Also, while encoding into color difference signals is shown, the chrominance signals could include I and Q chrominance signals, which are each typically a function of all of the primary color signals.

PARTS LIST

Transmitter processing section 10
Receiver processing section 12
Color transformation stage 14
Compression stage 16
Signal channel 17
Decompression stage 18
Inverse color transformation stage 20
Luminance compression stage 16a
Color difference compression stage 16b
Color difference compression stage 16c
Luminance decompression stage 18a
Color difference decompression stage 18b
Color difference decompression stage 18c
Inverse color transformation stage 20
Demultiplexer 22
Green interpolator 24
Summing element 26a
Summing element 26b
Storage module 28
Feedback decompression stage 30
Luminance feedback decompression stage 32
Image sensor 40
Camera lens 42
Color filter array 44
R, G, B color filters 44a, 44b, 44c
Lens aperture 46
Shutter 48
Optical low pass filter 50

Analog signal processor 52
A/D converter 54
Digital processing stage 58

What is claimed is:

1. An electronic camera, comprising:
 a color image sensor having a discrete array of image sensing photosites sensitive to a plurality of colors, said image sensor generating a plurality of primary color signals corresponding to the intensity of the light sensed by the photosites;
 means for converting the primary color signals into a luminance signal and at least one chrominance signal, wherein said at least one chrominance signal is a difference signal based on two or more of the primary color signals;
 compression means for generating compressed luminance and chrominance signals by lossy compression of the luminance and chrominance signals; and
 feedback means for generating a decompressed lossy signal from said luminance compressed signals, and for applying said decompressed lossy signal to said converting means for use in the generation of the difference signals prior to their compression by said compression means.

2. An electronic camera as claimed in claim 1 further including storage means for storing said compressed signals.

3. An electronic camera as claimed in claim 1 wherein the luminance signal is approximated by a green signal.

4. An electronic camera as claimed in claim 1 wherein said converting means further includes an interpolation section that uses the decompressed lossy signal to interpolate a plurality of lossy luminance interpolation signals for use in the generation of the difference signals.

5. Signal processing apparatus for processing a plurality of color image signals, said apparatus comprising:
 means for transforming the plurality of color image signals into a plurality of encoded signals, at least one encoded signal comprising an arithmetic difference derived from two or more of the color image signals;
 means for compressing said encoded signals by use of a lossy compression algorithm, said compression means producing compressed signals which include noise and artifacts introduced by the algorithm;
 means for decompressing at least one of the compressed signals to generate a feedback signal;
 means for applying said feedback signal to said transforming means, whereby said feedback signal is used in the arithmetic difference for at least one of said encoded signals prior to its compression by said means for compressing.

6. A method for processing a plurality of color image signals, comprising the steps of:
 transforming the plurality of color image signals into a plurality of encoded signals, including a luminance signal and at least one color difference signal derived from a combination of two or more of the color image signals;
 compressing the luminance signal by use of a lossy compression algorithm;
 decompressing the luminance signal to generate a feedback signal;
 applying the feedback signal to said transforming step, whereby the feedback signal is used in the generation of said at least one color difference signal; and
 compressing said at least one color difference signal by means of the lossy compression algorithm.

7. A method as claimed in claim 6 further comprising the step of storing the compressed encoded signals.

8. A method as claimed in claim 7 further comprising the step of interpolating a lossy luminance signal from the feedback signal, and wherein the step of applying the feedback signal to said transforming step uses the lossy luminance signal in the generation of said at least one color difference signal.

* * * * *